United States Patent [19]

Shelton et al.

[11] 3,911,040

[45] Oct. 7, 1975

[54] SEPARATION PROCESS

[75] Inventors: James Reid Shelton, East Cleveland, Ohio; Dale C. Perry, Minneapolis, Minn.

[73] Assignee: The Goodyear Tire & Rubber Company, Akron, Ohio

[22] Filed: June 10, 1974

[21] Appl. No.: 478,120

[52] U.S. Cl. ... 260/681.5 R; 260/75 T; 260/75 UA; 260/666 A; 260/88.2 E
[51] Int. Cl. ............................................. C07c 7/02
[58] Field of Search .................. 260/681.5 R, 666 A

[56] References Cited
UNITED STATES PATENTS
3,492,366  1/1970  Winter............................ 260/666 A FOREIGN PATENTS OR APPLICATIONS
574,058  12/1945  United Kingdom.......... 260/681.5 R
576,592   4/1946  United Kingdom.......... 260/681.5 R Primary Examiner—Paul M. Coughlan, Jr.
Attorney, Agent, or Firm—F. W. Brunner; R. A. Thompson

[57] ABSTRACT

A method for the selective removal of 1,3-cyclopentadiene from hydrocarbon mixtures containing conjugated diolefins using polyester compounds containing maleate units.

3 Claims, No Drawings

SEPARATION PROCESS

This invention is directed to a method for the selective separation of certain hydrocarbon mixtures. More specifically, this invention is directed to an improved method for the selective removal of 1,3-cyclopentadiene (CPD) from hydrocarbon mixtures containing conjugated diolefins.

It is known that 1,3-cyclopentadiene has an adverse effect on certain organometallic catalyst systems when these systems are used to polymerize conjugated diolefins. These catalysts are rendered ineffective or their activity is greatly diminished by the presence of even small amounts of 1,3-cyclopentadiene.

Therefore, it has become highly desirable in the petrochemical business to remove materials such as 1,3-cyclopentadiene from the hydrocarbon streams, particularly those containing conjugated diolefins because of the deleterious effect of 1,3-cyclopentadiene when these hydrocarbon streams are used with organometallic catalyst systems for polymerization purposes.

Prior art methods of removing 1,3-cyclopentadiene from hydrocarbon mixtures have presented many and various disadvantages. A long-used method of removing 1,3-cyclopentadiene from $C_5$ diene streams is to dimerize the 1,3-cyclopentadiene and distill off the desired $C_5$ dienes. The more common dimerization process requires heating of the stream under pressure to around 100° to 200°C. prior to fractionation.

Another method of separation involves treatment with sulfur dioxide ($SO_2$), which converts the acyclic dienes to sulfones. The sulfones must then be distilled from the cyclopentadiene and finally heated at around 140°C. to yield the purified acyclic dienes.

Another method of removing 1,3-cyclopentadiene involves its condensation with a carbonyl compound in the presence of a base, thereby forming a higher boiling fulvene. The excess carbonyl must be removed by washing. Then the desired dienes can be distilled from the fulvene.

Extractive distillation has been used to separate 1,3-cyclopentadiene from other $C_5$ dienes by using aniline, furfural, acetonitrile, or dimethylformamide as the solvent. This method requires the use of several hundred feet of fractionating towers.

Streams contaminated with 1,3-cyclopentadiene can be purified by treatment with aqueous maleic acid at around 140°–150°C. This method provides one-step purification but requires large excesses of the acid and vigorous agitation for adequate contact between the aqueous and hydrocarbon phases.

Bed-type processes have been applied to 1,3-cyclopentadiene removal. One such process is to pass the stream through finely divided sodium. Even though it removes 1,3-cyclopentadiene it suffers from the constant danger of fire and the inability of the spent removal medium to be readily regenerated.

Aluminosilicate beds have been used to remove 1,3-cyclopentadiene. They require that the stream be passed through as vapor at around 200°C. and must be heated to 500°–550°C. for regeneration.

A mixture of activated zinc, aluminum, and silicon oxides can be used in bed-type, 1,3-cyclopentadiene removal. Such a bed requires heating at 1000°F. for regeneration. More recently, ion exchange resins have been adapted to 1,3-cyclopentadiene removal. They provide a simple, effective means for purifying 1,3-cyclopentadiene-contaminated streams.

Probably the most common means of removing 1,3-cyclopentadiene is to treat streams containing it with maleic anhydride. Maleic anhydride (MA) can be added in such solvents as acetonitrile, dimethylformamide, or dioxane; for small amount of 1,3-cyclopentadiene it can be added without a solvent. No matter how the maleic anhydride is added, separation of the desired dienes from the maleic anhydride 1,3-cyclopentadiene adduct requires a second step such as fractional distillation or extraction with caustic solution, or cooling to crystallize out the adduct of maleic anhydride and cyclopentadiene.

It is an object of the present invention to offer an economical process for the removal of 1,3-cyclopentadiene from certain hydrocarbon mixtures.

Accordingly, there is provided a method of selectively removing 1,3-cyclopentadiene from a hydrocarbon mixture containing 1,3-cyclopentadiene and other hydrocarbons which comprises the steps of intimately contacting said hydrocarbon mixture containing 1,3-cyclopentadiene with a polyester compound containing a maleate unit to form an adduct of 1,3-cyclopentadiene and the polyester compound containing a maleate unit and subsequently separating the remaining hydrocarbons from the adduct.

The invention described in this application provides a safe, simple, relatively low temperature one-step process for removing 1,3-cyclopentadiene from $C_5$ dienes or hydrocarbon mixtures. Moreover, 1,3-cyclopentadiene-saturated maleate polyesters can be partially regenerated under much milder conditions than those required for most other bed-type processes. They can be regenerated by heating under a nitrogen stream for one hour at a temperature up to 350°C. The temperature of the regeneration of the polyester compound containing the maleate unit is not very critical except to say that the heating should not be so severe as to decompose or char the polyester compound. Usually regeneration temperatures of less than 350°C. will regenerate polyester compound by driving off the 1,3-cyclopentadiene without doing harm to the polyester compound.

The compounds which contain the maleate unit or moiety useful in the practice of this invention are polyesters.

A unique aspect of the present invention is that the polyesters containing the maleate unit are not soluble in the hydrocarbon phase. Thus, the 1,3-cyclopentadiene is removed from the hydrocarbon mixture in a one-step reaction. The polyester can be considered a support for the maleate unit and it can take several forms and can be used in several different manners in order to support the maleate unit. For instance, the polyester containing the maleate unit can be used as a liner on pipes, columns or tanks through which the hydrocarbon mixture is passed. It can also be used as a self-supporting resin which is packed in a column or bed through which the hydrocarbon mixture is passed or it can be used as a coating on another support material such as silica, alumina, etc. and then used to pack beds or columns.

Polyester can be defined as a compound derived from the reaction of maleic anhydride or maleic acid with a polyol. A polyol is a compound having two or more hydroxy groups, commonly referred to as a polyhydroxy compound.

The type of polyol reacted with the maleic anhydride or maleic acid will determine the physical characteristics that the polyester exhibits. The polyester characteristics in themselves are not the thrust of this invention, but it should be appreciated that the nature of the polyester will determine how the polyester containing the maleate unit can be best utilized. If the polyester is a hard resinous type material it can be used as a column packing by itself. If it is soft, then it can be impregnated on one of the well known supports, then used in the removal process.

The temperature at which the process can be operated is not critical except that the temperature should not be so high as to vaporize the hydrocarbon mixture so that it cannot be contacted by the maleate units. The pressure is not critical either and can be from subatmospheric to super atmospheric conditions. Temperatures can range from about 0°C. to 100°C.

Representative of the polyols that can be utilized in the practice of this invention are ethylene glycol, cyclohexane dimethanol, glycerine, pentaerythritol, 2,2-bis[4-($\beta$-hydroxyethoxy)phenyl] propane, butane diol, 1,3-propane diol, polymethylene glycols, propylene glycol, tetramethylene glycol, neopentylene glycol, hexamethylene glycol and the like. The maleate unit is derived from the reaction of either maleic acid or maleic anhydride with a polyol to give the polyester compound. This polyester is then usually placed on a support which has been described above.

In a typical polyester preparation, the mixture of a 10 percent molar excess of ethylene glycol with maleic anhydride was heated under nitrogen for three hours at 190°C., 60 millimeters (mm.) Mercury (Hg.). Polyester acetone solutions were used for depositing the polyesters onto the various supports such as sand, etc. with the acetone being removed under vacuum in a rotating evaporator.

It should be understood that the polyester compound can be a semi-solid, or a solid which can be ground into small chips, depending on the characteristics of the starting polyol material. When the polyester molecular weight is high enough, the material can be ground up and used as a column packing by itself without having to be deposited on anything such as sand, silica, alumina or other nonreactive support material.

The practice of this invention is further illustrated by reference to the following examples which are intended to be representative rather than restrictive of the scope of this invention.

EXAMPLE I

A tacky, solid polyester of high cold flow was prepared by condensation of 4.08 moles ethylene glycol (EG) with 3.71 moles maleic anhydride (MA) for three hours under $N_2$ atmosphere at 190°C., 60 mm. Hg. The bottom of a glass vial was covered with 25 parts of the polyester, which flowed sufficiently to cover the entire surface. Then 100 parts of a hydrocarbon mixture containing 68 percent isoprene, one percent CPD and 31 percent $C_5$ olefins and pentane was added to the vial and thereby contacted interfacially with the polyester. The hydrocarbon mixture was analyzed by gas liquid chromatography (GLC) after various storage periods over the polyester in the closed vial at 23 °C.

| Time | % Isoprene | % CPD | % CPD Removed |
| --- | --- | --- | --- |
| 0 (no treatment) | 67.91 | 1.16 | 0 |
| 10 min. | 68.28 | 1.05 | 9.5 |
| 4 days | 68.24 | 0.0000 | 100 |

EXAMPLE II

An ethylene glycol-maleic anhydride (EG-MA) polyester sample similar to that of Example I was deposited from acetone solution onto one eighth inch to one quarter inch diameter limestone rocks as a 6.5 weight percent coating. Then 100 parts of the hydrocarbon mixture similar to Example I was placed in a bed containing 279 parts of the polyester coated rocks (8.37 parts polyester). The bed design was such that the hydrocarbon mixture level was just below the rock level. Hydrocarbon mixture samples were analyzed by GLC after various periods on the bed at 23°C.

| Time, Hr. | % Isoprene | % CPD | % CPD Removed |
| --- | --- | --- | --- |
| 0 (no treatment) | 68.01 | 1.15 | 0 |
| 0.25 | 68.02 | 1.13 | 1.7 |
| 0.67 | 68.25 | 1.11 | 3.5 |
| 2.25 | 68.46 | 0.98 | 14.8 |
| 4.0 | 68.50 | 0.87 | 24.3 |
| 11.0 | 68.53 | 0.57 | 50.4 |

EXAMPLE III

A two percent EG-MA polyester (similar to Example I) sand mixture was prepared by depositing from acetone solution an EG-MA polyester onto sea sand (diameter ~ 1mm.). Then 100 parts of the hydrocarbon mixture of Example I was added below the surface of a bed consisting of 259 parts coated sand (5.18 parts polyester). Samples of the hydrocarbon mixture were analyzed by GLC after various time periods on the bed at 23°C.

| Time, Hr. | % Isoprene | % CPD | % CPD Removed |
| --- | --- | --- | --- |
| 0 (no treatment) | 68.06 | 1.15 | 0 |
| 1 | 68.10 | 0.966 | 15.7 |
| 2 | 68.12 | 0.773 | 33.0 |
| 21 | 68.43 | 0.220 | 80.9 |
| 24 | 68.34 | 0.192 | 83.3 |
| 26 | 68.61 | 0.170 | 85.2 |
| 43 | 68.37 | 0.112 | 90.3 |
| 115 | 68.38 | 0.046 | 96.0 |
| 163 | 68.94 | 0.027 | 97.7 |

EXAMPLE IV

A two percent EG-MA polyester/sand composition similar to that in Example III was used for the bed treatment at 50°C. of a hydrocarbon mixture containing 68 percent isoprene, one percent CPD, and 31 percent $C_5$ olefins and pentane. The initial molar ratio of maleate units to CPD was 2:1. Samples of the stream were analyzed by GLC after various time periods on the bed at 50°C. For the purpose of comparison an identical hydrocarbon mixture was placed on a bed consisting of sand alone and analyzed by GLC after various time periods on the polyester-free bed at 50°C. The percent CPD removal on polyester-free sand is given in parenthesis.

| Time, Hr. | % Isoprene | % CPD | % CPD Removed* |
|---|---|---|---|
| 0 (no treatment) | 68.32 | 1.19 | 0 |
| 0.25 | 68.39 | 0.678 | 43.0 |
| 1.0 | 68.34 | 0.476 | 60.0 (3.1) |
| 2.0 | 68.52 | 0.233 | 80.4 |
| 4.0 | 68.59 | 0.130 | 89.1 (6.1) |
| 8.0 | 68.68 | 0.0926 | 92.2 |
| 70 | 68.39 | 0.0021 | 99.8 (31.8) |

*Values in parentheses are for CPD removal at 50°C. in the absence of maleate polyester and would be considered as control experiments.

The bed treatment demonstrates how the polyester compounds could be used to line storage vessels for CPD contaminated streams and remove CPD selectively during the storage period.

EXAMPLE V

A two percent EG-MA polyester/sand composition similar to that in Example III was used for the bed treatment at 50°C. of a hydrocarbon mixture containing 68 percent isoprene, one percent CPD and 31 percent $C_5$ olefins and pentane. The initial molar ratio of maleate units to CPD was 2:1. After the CPD removal rate, as monitored by GLC, leveled off for the first $C_5$ sample, that sample was removed. The bed was then rinsed with pentane and dried under vacuum of 23°C. Then a second $C_5$ sample identical in composition and size to the first was placed on the bed and monitored for CPD removal at 50°C. After 20 hours of treatment the second sample was removed and replaced with a third one after the bed had been rinsed and dried as before. The three treatments saturated the bed such that it showed no activity for CPD removal beyond that obtainable by thermal dimerization. The spent bed material was then placed in a quartz tube and purged with nitrogen while at 23°C. While the nitrogen stream continued, the bed was heated to 150°C. and kept there for one hour. GLC analysis of the effluent recovered from liquid nitrogen traps indicated that it was CPD. The polyester/sand composition was then placed back into the bed and used to treat at 50°C. a fourth $C_5$ sample of identical size and composition to the previous three. GLC analysis after various time periods indicated that the polyester/sand composition had regained a significant proportion of its original activity after regeneration at 150°C. under nitrogen. Data are presented in the following table.

Column 1 represents the time intervals that samples were removed for GLC analysis.

Column 2 represents the first hydrocarbon mixture bed treatment and the amount of CPD removed at the designated time intervals.

Column 3 represents the second hydrocarbon mixture placed on the same bed that was used to treat the first hydrocarbon mixture and the CPD removed at the designated time intervals.

Column 4 represents the third hydrocarbon mixture placed on the same bed that was used to treat the first and second hydrocarbon mixtures and the CPD removed at the designated time intervals.

Column 5 represents the hydrocarbon mixture after the polyester bed has been heated to regenerate its capacity.

PERCENT CPD REMOVED FROM SAMPLE NUMBER

| Time, Hr. | 1 | 2 | 3 | 4 (after regeneration) |
|---|---|---|---|---|
| 1 | 60 | 5 | 4 | 43 |
| 2 | 80 | 9 | 5 | 51 |
| 4 | 89 | 16 | 7 | 57 |
| 8 | 92 | 26 | 12 | 61 |
| 20 | 98 | 41 | 20 | 65 |

This example does not represent an optimum regeneration system. The polyester used was not high molecular weight and therefore some was lost on the quartz tube when it was heated to remove the 1,3-cyclopentadiene. However, this example does illustrate the capability of the removal system to be regenerated.

EXAMPLE VI

In this example a 100 ml. hydrocarbon mixture containing 62 percent isoprene, 0.1 percent 1,3-cyclopentadiene and 38 percent $C_5$ olefins and pentane was passed through a column seven sixteenths inches inner diameter by 6½ inches long containing 5 percent ethylene glycol-maleic anhydride polyester deposited on silica at room temperature five times. Since the column used for passing the hydrocarbon mixture through was so short, it was decided to pass the hydrocarbon mixture through a number of times in order to more closely simulate a more practical and efficient demonstration of the polyester removal ability.

After each pass of the hydrocarbon mixture through the column it was analyzed to determine what percent 1,3-CPD had been removed in that particular pass, and then the cumulative percent removal of 1,3-CPD was determined.

Column 1 represents the number of passes through the polyester packed column.

Column 2 represents the amount of isoprene determined to be left after each pass through the column. It can be seen that very little isoprene was lost after each pass.

Column 3 represents the parts per million of the 1,3CPD left in the hydrocarbon mixture after its passage through the column.

Column 4 represents the cumulative percent amount of 1,3-CPD removed from the hydrocarbon mixture.

Column 5 represents the percent amount of 1,3-CPD removed in that particular numbered pass through the column.

| No. Passes | Percent Isoprene | ppm CPD | Percent CPD Removed Overall | This Pass |
|---|---|---|---|---|
| 0 | 62.0 | 960 | 0 | 0 |
| 1 | 61.2 | 645 | 32.8 | 32.8 |
| 2 | 61.6 | 488 | 49.2 | 24.3 |
| 3 | 61.4 | 350 | 63.5 | 28.3 |
| 4 | 61.7 | 261 | 72.8 | 25.4 |
| 5 | 61.5 | 134 | 86.0 | 48.7 |

While certain representative embodiments and details have been shown for the purpose of illustrating the invention, it will be apparent to those skilled in this art that various changes and modifications may be made therein without departing from the spirit or scope of the invention.

What is claimed is:

1. A method of selectively removing 1,3-cyclopentadiene from a hydrocarbon mixture containing 1,3-cyclopentadiene and other hydrocarbons, which comprises the steps of intimately contacting said hydrocarbon mixture containing 1,3-cyclopentadiene with a polyester compound containing a maleate unit, to form an adduct of 1,3-cyclopentadiene and the polyester compound containing a maleate unit, and subsequently separating the remaining hydrocarbons from the adduct.

2. A method according to claim 1 wherein the contacting of said hydrocarbon mixture with the polyester compound is conducted at from 0° to 100°C.

3. A method according to claim 1 wherein the polyester compound after being contacted by the 1,3-cyclopentadiene is regenerated by heating up to 350°C. while purging with nitrogen.

\* \* \* \* \*